United States Patent Office 3,029,248  
Patented Apr. 10, 1962

3,029,248  
CERTAIN PHOSPHORUS ESTERS OF 5 HYDROXY-2,1,3-BENZOTHIADIAZOLE  
Helmut Hoffmann, Koln-Stammheim, Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany  
No Drawing. Filed Apr. 28, 1960, Ser. No. 25,210  
Claims priority, application Germany May 2, 1959  
11 Claims. (Cl. 260—304)

The present invention relates to and has as its objects new and useful insecticidally active esters of phosphoric acids, phosphonic acids and phosphinic acids as well as their thiono analogues, and processes for their production. Generally the new compounds of this invention are such esters of the above said phosphorus derivatives of 5-hydroxy-2,1,3-benzothiadiazol of the general formula

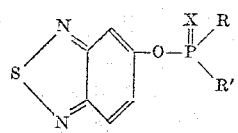

In the above formula R denotes an alkoxy-, alkylmercapto-, aliphatic- or aromatic radical (which may be saturated, unsaturated or optionally substituted), $R_1$ denotes an identical or different alkoxy, alkylmercapto, alkyl or aryl radical or an optionally substituted amino group, and X denotes an O or S atom.

5-hydroxy-2,1,3-benzothiadiazol (or 4'-hydroxybenzo-1',2',3,4-(1,2,5-thiodiazole) has been described by Authenried and Hinsberg, Ber. 25, 501.

The production of the new esters is carried out in known manner by the reaction of 5-hydroxy-2,1,3-benzothiadiazol with the corresponding (thio)phosphoric, (thio)phosphonic or (thio)phosphinic acid chlorides in the presence of acid-binding agents. Especially suitable as an acid-binding agent is potassium carbonate. Optionally a trace of powdered copper is added and preferably the reaction is carried out at an elevated temperature and in the presence of an inert solvent or diluent.

As diluents inert solvents such as benzene, chlorobenzene, acetonitrile and ketones, preferably methyl ethyl ketone, have been found to be eminently suitable.

The esters obtained according to the invention are either highly viscous oils or crystalline compounds having a good insecticidal activity. This discovery is surprising the more so since 5-hydroxy-2,1,3-benzothiadiazol is a compound of very weakly basic properties, whilst usually only phosphoric and thionophosphoric acid esters of more strongly acid phenols (such as p-nitrophenol) are useful insecticides.

Another advantage of the esters obtainable according to the invention is their partially low toxicity for warm-blooded animals.

The new compounds of the present invention very effectively kill insects like flies, mites, aphids, etc. They distinguish themselves especially by a good contact-insecticidal activity and at the same time by an activity on eating insects such as caterpillars. They may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the present invention the compound of the following formula

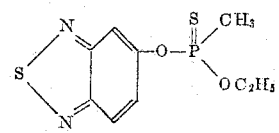

has been tested against flies and spider mites. Aqueous dilutions of the above compound have been prepared by mixing the active ingredient with the same amount of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs. The tests have been carried out as follows:

(a) Against flies (*Musca domestica*). About 50 flies are placed under covered petri dishes in which drip wet filter paper has been placed which is sprayed with an insecticidal solution of a concentration of 0.001%. The living status of the flies has been determined after 24 hours. 100% killing has been obtained.

(b) Against spider mites: Bean plants (*Phaseolus vulgaris*) of about 15 inches height are sprayed drip wet with solutions prepared as indicated above. The bean plants have been infested heavily with the two-spotted spider (species *Tetranychus telarius*). Evaluation has been carried out after 24 hours, 48 hours and 8 days. The spider mites were killed completely with 0.001% solutions.

The following examples are given for the purpose of illustrating the present invention.

*Example 1*

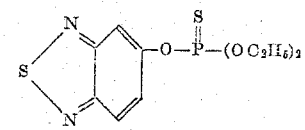

50 grams (0.33 mol) of 5-hydroxy-2,1,3-benzothiadiazol (M.P. 161–162° C.) are dissolved in 400 cc. of methyl ethyl ketone. After the addition of 92 grams (0.66 mol) of powdered potassium carbonate, the mixture is heated to 60–70° C. for half an hour. By precipitation of the scarcely soluble potassium salt of 5-hydroxy-2,1,3-benzothiadiazol the solution becomes substantially thicker. 5 grams of powdered copper are then added and 62 grams (0.33 mol) of diethyl thiophosphoric acid chloride introduced dropwise at the same temperature. With slight evolution of heat the reaction sets in. After heating the mixture to 70–80° C. for a further three hours the reaction is completed. After cooling the reaction solution is filtered off with suction and the solvent distilled off in a vacuum. The residual oil is taken up in ether, washed first with water and subsequently with a dilute cold potassium carbonate solution. Washing with this solution is continued until the aqueous phase shows no further coloration. After drying of the ethereal solution, it is stirred with animal charcoal, filtered off and distilled. The new ester remains in the form of a yellow oil which is no longer distillable and solidifies upon undercooling, but becomes again liquid at body temperature. Yield 83 grams (91.2% of the theoretical). On rats per os the $LD_{50}$ is 50 mg./kg. Aphids are killed completely with 0.01% solutions, spider mites are killed completely with 0.1% solutions. The compound has an ovicidal action. Mosquito larvae are killed completely with 0.0001% solutions.

By exactly the same way there may be obtained the following compounds:

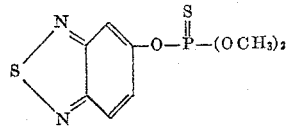

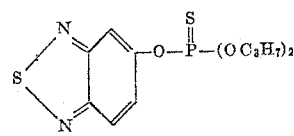

*Example 2*

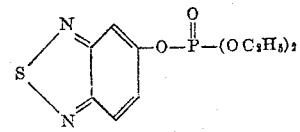

20 grams (0.132 mol) of 5-hydroxy-2,1,3-benzothiadiazol (M.P. 161–162° C.) and 38 grams (0.264 mol) of powdered potassium carbonate are heated in 160 cc. of methyl ethyl ketone to 60–70° C. for a half hour. After the addition of 0.2 gram of powdered copper 23 grams (0.132 mol) of diethyl phosphoric acid chloride are added dropwise. The evolution of heat is slight. For completion of the reaction the mixture is heated to 70–80° C. for a further three hours, the salts are filtered off after cooling and the filtrate is poured into a large quantity of water. The precipitated oil is taken up in benzene, briefly washed with 20 cc. of a cold saturated potassium carbonate solution and finally washed neutral with water. After drying with sodium sulfate and distilling off the solvent 26 grams of the ester remain as a brown oil. The ester cannot be distilled without decomposition. Yield 68.5% of the theoretical.

On rats per os the toxicity is 50 mg./kg. $LD_{50}$. Aphids and caterpillars are killed completely with 0.1% solutions. Spider mites are killed to 60% with 0.001% solutions. Systemic action with 0.1% solutions=100%.

By the same way there may be obtained the following compounds:

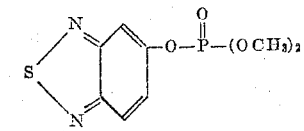

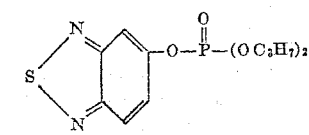

*Example 3*

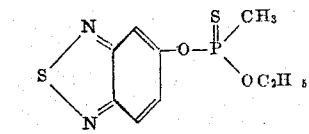

20 grams (0.132 mol) of 5-hydroxy-2,1,3-benzothiadiazol (M.P. 161–162° C.) and 38 grams (0.264 mol) of powdered potassium carbonate are heated to 60–70° C. for half an hour in 160 cc. of methyl ethyl ketone. 0.2 gram of powdered copper are then added and 21 grams (0.133 mol) of methyl thionophosphonic acid ethyl ester chloride introduced dropwise at the same temperature. It is not necessary to remove the reaction heat evolved. After heating the mixture to 70–80° C. for three hours, it is allowed to cool, the salts are filtered off and the filtrate poured into water. The oil is taken up in benzene, washed with water and with a potassium carbonate solution until the aqueous solution remains colorless. It is finally washed neutral with water. It is dried over sodium sulfate, clarified with animal charcoal, filtered and the solvent distilled off. In this way, 23 grams of the ester are obtained as a clear brown oil which cannot be distilled. Yield 63.6% of the theoretical. On rats per os the $LD_{50}$ is 5 mg./kg. Flies and spider mites are killed completely with 0.001% solutions. Mosquito larvae are killed to 80% with 0.000001% solutions.

By the same way there may be obtained the following compounds:

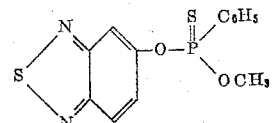

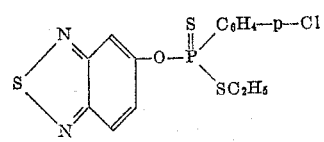

*Example 4*

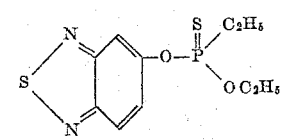

20 grams (0.132 mol) of 4-hydroxy-2,1,3-benzothiadiazol and 38 grams (0.264 mol) of powdered potassium carbonate are heated to 60–70° C. for a half hour in 160 cc. of methyl ethyl ketone. After addition of 0.2 gram of powdered copper, there are added dropwise at the same temperature 24 grams (0.132 mol) of ethyl thionophosphonic acid ethyl ester chloride and the mixture is heated to 70–80° C. for 3 hours. After processing in the usual manner, 31 grams of the ester are obtained as a brown somewhat viscous oil which slowly solidifies. M.P. 52° C. Insoluble in petroleum ether. On rats per os the $LD_{50}$ is 10 mg./kg. 0.001% solutions kill aphids to 80% and spider mites completely. The compound has an ovicidal action. Caterpillars are killed completely with 0.1% solutions. Systemic action with 0.1% solutions=100%.

By the same way there may be obtained the following compounds:

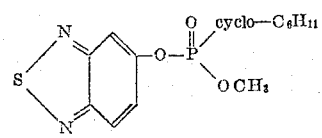

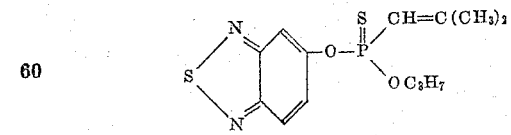

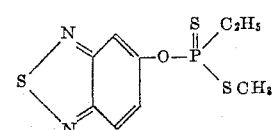

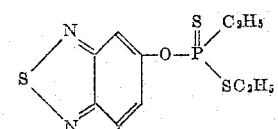

Example 5

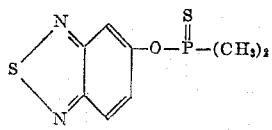

20 grams (0.132 mol) of 5-hydroxy-2,1,3-benzothiadiazole and 38 grams (0.264 mol) of powdered potassium carbonate in 160 cc. of methyl ethyl ketone and a little powdered copper are reacted in the manner described above with 17 grams (0.132 mol) of dimethyl thionophosphinic acid chloride. After working up the reaction product in the usual manner an oil is obtained which rapidly crystallizes. Upon rubbing with petroleum ether a yellowish-colored crystalline powder of M.P. 74° C. is obtained. Yield 37.3% of the theoretical.

On rats per os the toxicity is 10 mg./kg. $LD_{50}$. Spider mites are killed completely with 0.01% solutions and mosquito larvae are killed completely with 0.0001% solutions.

By exactly the same way there may be obtained the following compounds:

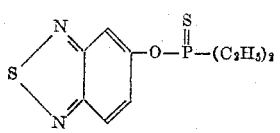

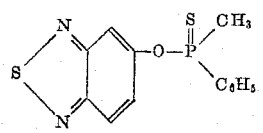

Example 6

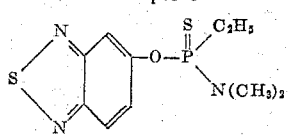

20 grams (0.132 mol) of 5-hydroxy-2,1,3-benzothiadiazole are dissolved in 160 cc. of methyl ethyl ketone and after the addition of 38 grams of powdered potassium carbonate heated to 60–70° C. for 30 minutes. After the addition of 0.2 gram of powdered copper 23 grams (0.132 mol) of ethyl thionophosphonic acid dimethyl amino chloride are added dropwise at 60–70° C. With a slight evolution of heat the reaction sets in which is completed by heating to 70–80° C. for three hours. After cooling, the salts are filtered off with suction and the filtrate is poured into water. The precipitated oil is taken up in benzene, washed first with water and then with a cold saturated potassium carbonate solution until it remains colorless. After washing neutral with water, the benzene is dried over sodium sulfate and after distilling off the solvent an oil is obtained which rapidly crystallizes. Upon recrystallization from benzene/petroleum ether small nearly colorless needles of M.P. 159–160° C. are obtained. Barely soluble in ether, alcohol and petroleum ether, but readily soluble in benzene. Yield 32 grams (84.5% of the theoretical).

Mosquito larvae are killed completely with 0.001% solutions and spider mites are killed completely with 0.1% solutions.

By exactly the same way there may be obtained the following compounds:

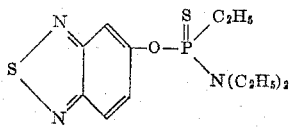

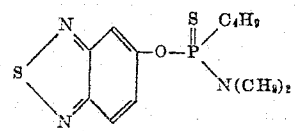

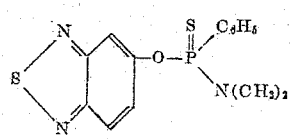

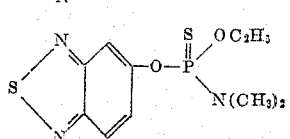

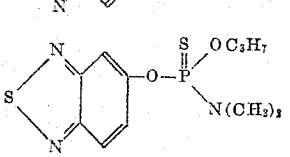

We claim:
1. The compound of the following formula

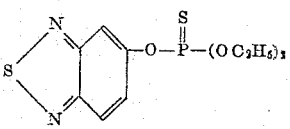

2. The compound of the following formula

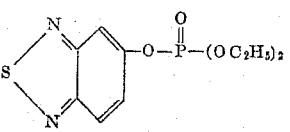

3. The compound of the following formula

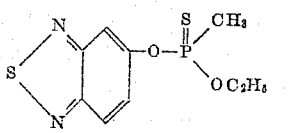

4. The compound of the following formula

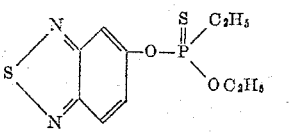

5. The compound of the following formula

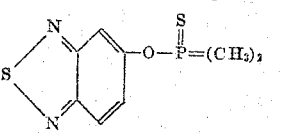

6. The compound of the following formula

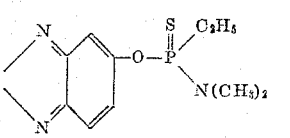

7. A phosphorus compound of the following formula

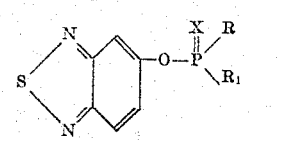

in which R stands for a member selected from the group consisting of lower alkoxy and lower alkyl-mercapto groups, alkyl having from 1 to 4 carbon atoms, lower alkylene having up to 6 carbon atoms, cyclohexyl, chlorophenyl and phenyl, $R_1$ stands for a member selected from the group consisting of lower alkoxy, lower alkyl-mercapto, lower dialkyl amino, alkyl having from 1 to 4 carbon atoms, and phenyl, and X stands for a member selected from the group consisting of oxygen and sulfur.

8. A compound of claim 7 wherein R and $R_1$ are each lower alkoxy and X is sulfur.

9. A compound of claim 7 wherein R is alkyl having from 1 to 4 carbon atoms, $R_1$ is lower alkoxy and X is sulfur.

10. A compound of claim 7 wherein R and $R_1$ are each alkyl having from 1 to 4 carbon atoms and X is sulfur.

11. A compound of claim 7 wherein R is alkyl having from 1 to 4 carbon atoms, $R_1$ is lower dialklyamino and X is sulfur.

References Cited in the file of this patent

FOREIGN PATENTS 713,278    Great Britain _____ Aug. 11, 1954

OTHER REFERENCES

Hodgson et al.: Chem. Abstracts, vol. 43, column 222 (1949).